United States Patent [19]

Gilden et al.

[11] 4,333,342

[45] Jun. 8, 1982

[54] FLUID DAMPED SAW ACCELEROMETER

[75] Inventors: Meyer Gilden, West Hartford; Donald E. Cullen, Manchester; Thomas W. Grudkowski, Glastonbury, all of Conn.

[73] Assignee: United Technologies Corporation, Hartford, Conn.

[21] Appl. No.: 203,823

[22] Filed: Nov. 3, 1980

[51] Int. Cl.³ .............................................. G01P 15/08
[52] U.S. Cl. .............................. 73/516 R; 310/313 R; 310/329
[58] Field of Search .................... 73/517 R, 516 R; 310/326, 327, 329, 330, 313 R

[56] References Cited

U.S. PATENT DOCUMENTS 2,909,744 10/1959 Giovanni .......................... 73/516 R
3,858,064 12/1974 Schissler ......................... 310/329 X Primary Examiner—James J. Gill
Attorney, Agent, or Firm—M. P. Williams

[57] ABSTRACT

An accelerometer comprising a mass 10 supported on a piezoelectric cantilevered beam 12 with SAW resonators 17, 46 disposed on the surface of the beam includes cover plates 66, 68 over the SAW resonators and sealed to the beam by seals 70, 72 which may be rigid (glass frit) or soft (filled polyimid).

5 Claims, 3 Drawing Figures

FLUID DAMPED SAW ACCELEROMETER

TECHNICAL FIELD

This invention relates to accelerometers, and more particularly to fluid damped, surface effect cantilevered mass accelerometers.

BACKGROUND ART

It is known to use a variety of acceleration measuring devices, called accelerometers, particularly for guidance of aircraft, spacecraft, and guided weaponry. A common form of accelerometer is dynamic, employing closed loop feedback to determine accelerations in a sensitive axis. Devices of this type may typically sense accelerations on the order of ten micro g (the acceleration of gravity, 32 ft/sec$^2$), and are very expensive. In some applications, accelerations on the order of one thousand micro g are involved. This requires a different type of accelerometer. One form of accelerometer known to the prior art is a mass supported on a cantilevered beam, so that acceleration of the mass in the sensitive axis will cause a bending moment in the beam, resulting in a sensible strain. The sensing of strain in the beam has been achieved in a variety of ways. For instance, U.S. Pat. No. 3,411,361 describes the use of bonded resistor bridges disposed on the surfaces of a cavity within the beam to sense the strain therein. However, strain gages of the bonded resistor type typically have sensitivities on the order of two percent of full range, which is inadequate in many applications.

A more sensitive type of cantilevered mass accelerometer employs the variation in propagation time of a surface acoustic wave on a piezoelectric beam, such as quartz. The strain induced by bending alters the acoustic velocity of the wave in the beam, which can be measured in a variety of ways, such as alteration of the frequency of an oscillator in which the frequency determination is principally dependent upon the acoustic velocity of the wave. Such a device is disclosed, inter alia, in U.S. Pat. No. 3,863,497. It is known that devices of this type (when suitably designed) are capable of sensitivities which are at least two orders of magnitude better than the sensitivities of bonded resistor strain sensors. Thus, accelerometers employing SAW devices may have sensitivities on the order of 0.001% of full range.

One characteristic of cantilevered mass accelerometers is the resonant mechanical frequency thereof. It is obvious that the frequency of resonance of the cantilevered beam should be much higher than the equivalent frequency of the accelerations which it is desired to detect thereby. This is essential so that oscillations do not mask the sensing of the desired effect. Additionally, inadvertent inputs to the accelerometer (abrupt accelerations), such as may occur by collision of a space vehicle with a meteorite, may induce oscillations even if the resonant frequency is much higher than normal acceleration inputs. Such oscillations, even if filterable, may cause saturation and otherwise affect the response of the device to the desired effects being sensed.

In closed loop accelerometers, there is no need for a damping medium. In the case of a cantilevered mass, particularly those employing SAW devices to sense the resulting strain, the motion is basically imperceptible in the ranges of accelerations being sensed. Therefore, common forms of damping (such as eddy current and magnetic) are not useful. Furthermore, damping of the beam itself (such as by means of surface wax or organic tape) provides no damping at all to the mass, and such surface damping is of no value at the mass. It is clear that the mass itself has to be damped.

One well known form of damping in inertial devices is fluid damping. Fluid damping not only loads the member being damped, but it dissipates energy by moving fluid from one region to another. However, fluid damping of the mass of a cantilevered mass accelerometer cannot readily be achieved without having fluid adjacent the cantilever itself. When the cantilever comprises a stiff beam in which a surface effect is being measured, such as a SAW device, the fluid will alter or eliminate the surface effect being used to sense the corresponding strain. Thus, fluid damping of cantilevered mass accelerometers would appear to be limited to those which do not employ a surface effect, such as bonded resistor strain sensors. However, as described hereinbefore, the bonded resistor strain sensors which could survive immersion in a damping fluid will not likely provide the desired sensitivity and accuracy for many applications. And, it is impossible to increase that accuracy (such as by increasing the mass) without lowering the resonant frequency to a point where the device would be useless. Additionally, it is known that resistive strain sensors have a high sensitivity to temperature variation, which is very difficult to cause to track identically for cancellation purposes. And, resistive devices, being amplitude analog devices, are not suitable in many applications where digital computation is necessary and real time processing delay constraints preclude conversion of analog amplitude signals to digital form.

One solution to the isolation of a surface device from a damping fluid may appear to be the formulation of the surface acoustic wave devices on surfaces within a chamber formed within the beam itself. However, since the maximal strain as a consequence of acceleration is at the outside surfaces of the beam, and since the strain effects decrease with the distance from the surface, the sensitivity of such a device would be severely diminished. In fact, leaving sufficient wall thickness material for the beam so that it will retain its highly elastic character, with a high mechanical resonant frequency, the SAW devices may in fact end up very near the axis of the beam, and being almost completely insensitive to the desired accelerations.

Therefore, there is a real need in many applications for the features of an accelerometer which are achievable essentially only by the digital, compatible, high sensitive SAW type of strain sensor.

DISCLOSURE OF INVENTION

Objects of the invention include provision of a damped accelerometer which is sensitive, has a suitably high mechanical resonance frequency, and is compatible with digital processing.

According to the present invention, a cantilevered mass accelerometer employs a piezoelectric beam with a surface acoustic wave device formed on the surface thereof, the surface acoustic wave device being isolated from damping fluid by direct encapsulation on the surface of the beam. According further to the invention, a SAW device on a quartz beam of a cantilevered mass accelerometer is isolated beneath a quartz plate disposed to the beam by a glass frit.

The invention may be employed using single or differential SAW devices, is easily utilized in accelerometers employing different cuts of piezoelectric material, and may be readily implemented utilizing processing techniques known in the art, in the light of the teachings which follow hereinafter.

The foregoing and other objects, features and advantages of the present invention will become more apparent in the light of the following detailed description of exemplary embodiments thereof, as illustrated in the accompanying drawings.

BEST MODE FOR CARRYING OUT THE INVENTION

Figure 1:
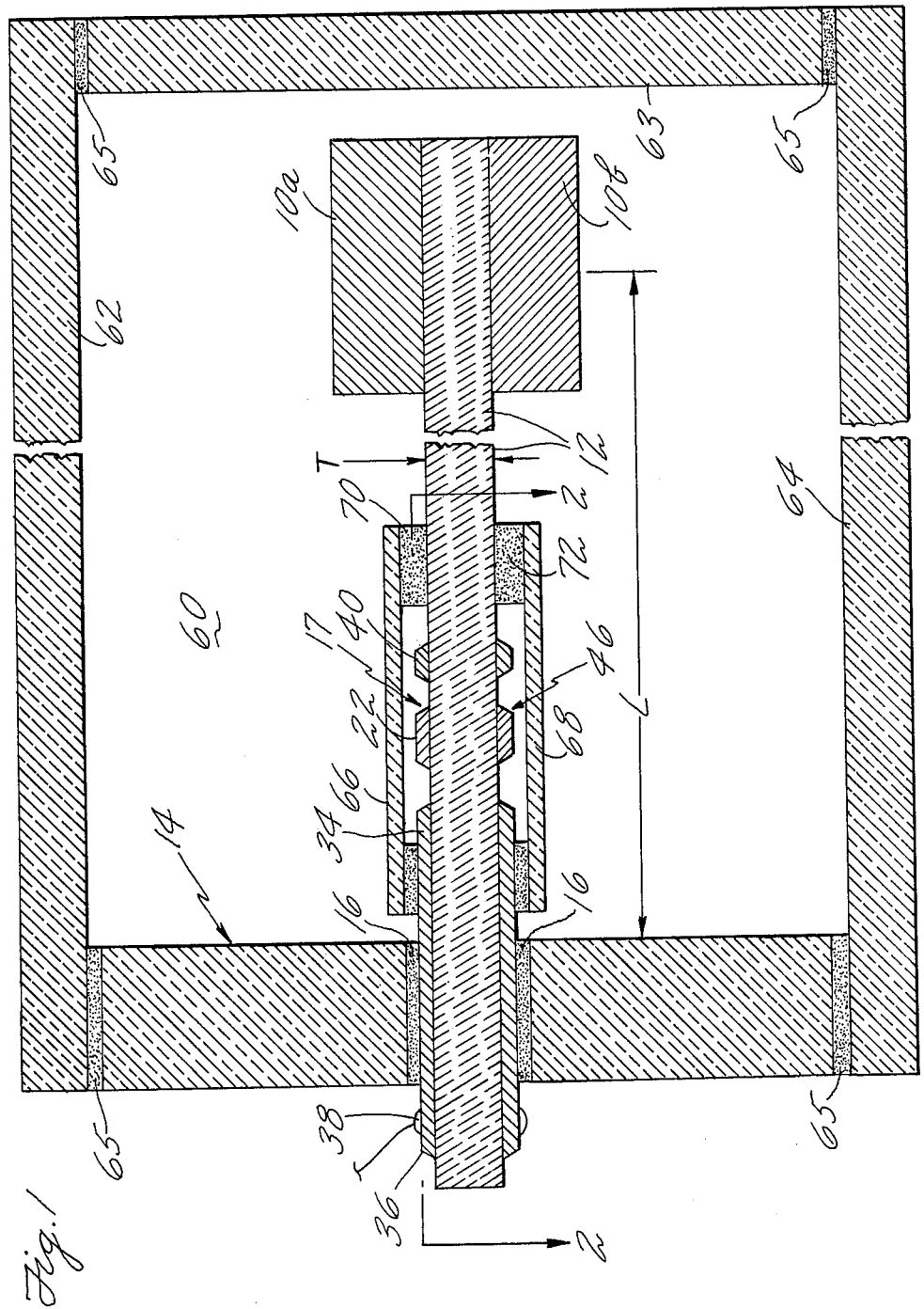
FIG. 1 is a partially broken away, sectioned side elevation view of an embodiment of the invention.
Figure 2:
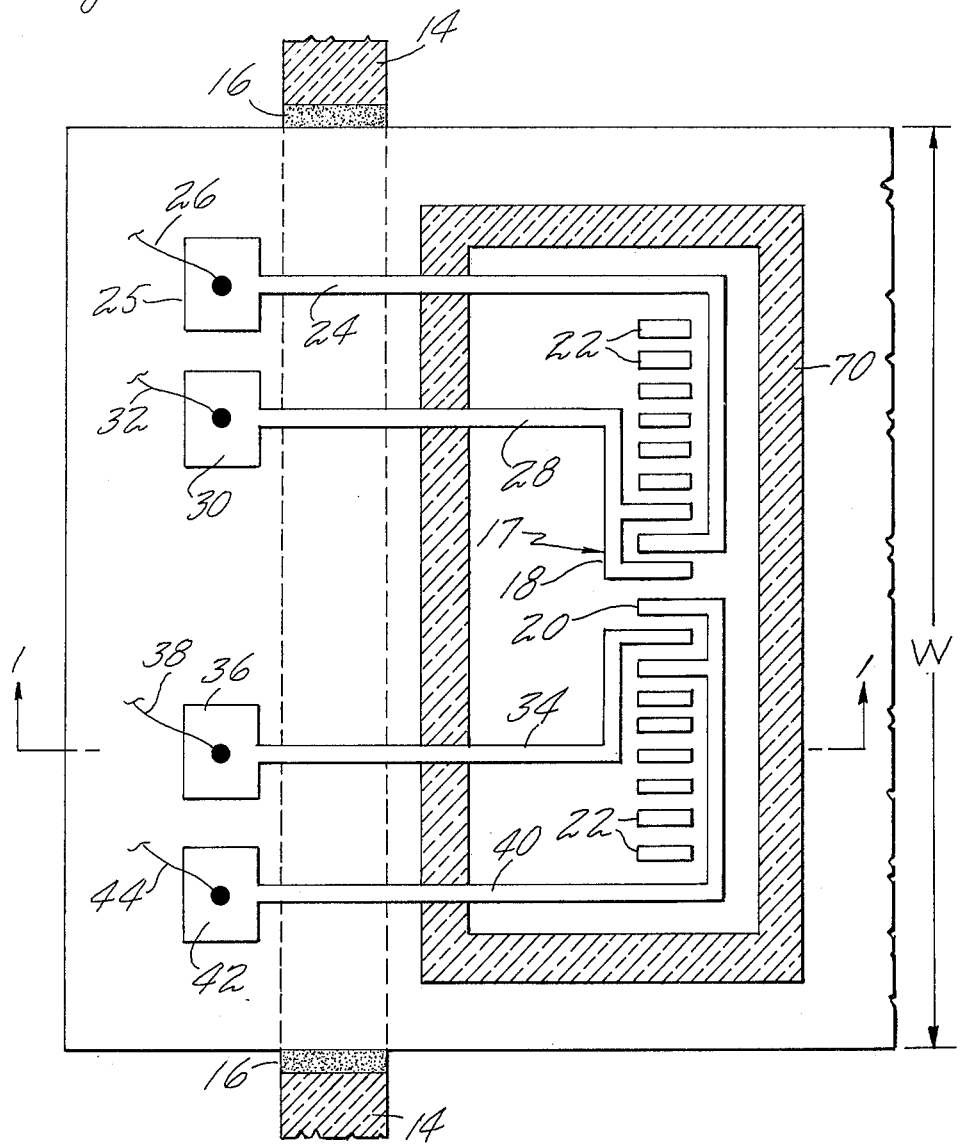
FIG. 2 is a partial, sectioned side elevation view taken on the line 2—2 in FIG. 1.

Referring now to FIGS. 1 and 2, a cantilevered accelerometer in accordance with the present invention may comprise a mass 10 disposed on a rigid elastic beam 12 which is rigidly mounted within a frame 14 so as to form a cantilever. The mass 10 may consist of suitably shaped blocks 10a, 10b of a heavy metal such as tungsten, or otherwise, as suits any implementation of the invention. The beam 12 should be a suitable piezoelectric material, such as Y-cut quartz in the exemplary embodiment herein. The blocks 10a, 10b may be bonded to the beam 12 in any suitable fashion since the portion of the beam 12 between the blocks is not subject to bending flexure. The beam 12 may be disposed in the frame 14 by means of bonding joints 16 consisting of sintered glass frit, polyimid resin, or other suitable bonding agent.

To read the acceleration-induced flexure of the beam 12, the strain in the surfaces of the beam is monitored by means of a surface acoustic wave (SAW) resonator. This may consist of a pair of interdigital electromagnetic transducers 18, 20 together with a plurality of reflector elements 22 disposed on opposite sides of the transducers 18, 20. The reflector elements 22 are typically one-quarter wavelength in width and separated by one-quarter wavelength. This configuration, as is known in the art, forms a resonator such that the minimum insertion loss of electroacoustic coupling between the transducers 18, 20 will be at the resonant frequency determined by the acoustic velocity of the medium (Y-cut quartz in the example herein) and the spacing of the reflector elements 22, the elements 18, 20, 22 being designed to suit the propagation velocity of the medium for the desired resonance wavelength, all as is known in the art. The ground side of the transducer 18 is connected by metallization 24 to a contact pad 25 to which a suitable lead 26 may be wire bonded. Similarly, the other side of the transducer 18 may be connected by metallization 28 to a pad 30 to which a lead 32 may be wire bonded. The ground side of the transducer 20 is connected by metallization 34 to a pad 36 for connection with the lead 38, and the other side of the transducer 20 is connected by metallization 40 to a pad 42 for connection to a lead 44. All of the metallization elements may be formed by deposition of a suitable thin film of metal, such as aluminum, as is known in the art.

As is known, Y-cut quartz includes a phenomenon that flexure of the beam along its longitudinal axis will alter the propagation velocity of acoustic surface waves at the surface thereof in a direction which is orthogonal to the flexure. And, the effect on the propagation velocity of the acoustic wave is of the same sense as the change in strain in the surface. Thus, if the mass 10 moves upwardly to bend the beam 12 in a concave fashion with respect to the SAW device 17, the velocity will increase, whereas if the beam 10 moves downwardly so that the surface of the beam where the SAW device 17 is mounted becomes convex, the velocity will decrease, causing a commensurate similar variation in the resonant frequency of an oscillator circuit which includes the SAW device.

Figure 3:
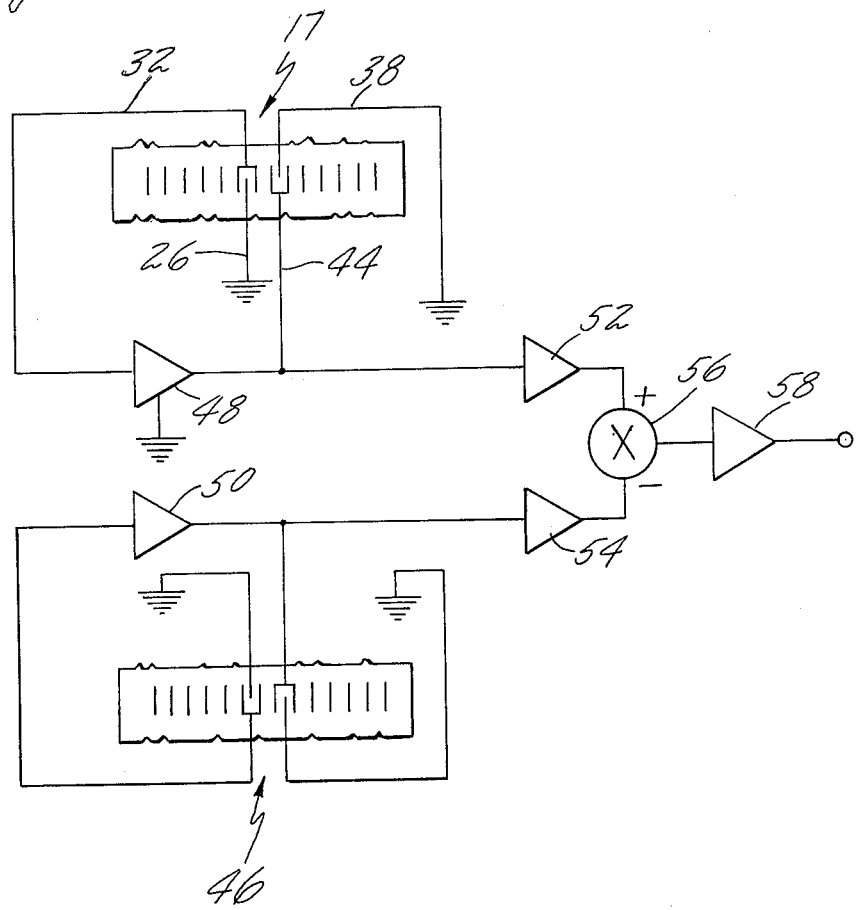
FIG. 3 is a simplified schematic diagram of a differential oscillator configuration which may be employed with the present invention.

As is illustrated in FIG. 1 and FIG. 3, since the strain effects are opposite on the opposite surfaces, it is normal to employ an additional SAW device 46 on the opposite surface of the beam 12, which is identical to the SAW device 17 described hereinbefore. This not only doubles the sensitivity (having two measurements of the same strain which are additive), but also allows cancellation of temperature effects since the temperature effects will be in the same direction in both cases, and subtraction of the two frequencies by nonlinear mixing will produce a difference frequency in which the temperature effect has canceled. In FIG. 2 the two SAW devices 17, 46 are each seen to be connected in series with a related amplifier 48, 50 so as to form an oscillator, the resonant frequency of which is a function of the acoustic velocity of the SAW device, and therefore of the strain in the surface on which the SAW device is disposed. The signal of the oscillators may be passed through related buffer amplifiers 52, 54 and thence to a product mixer 56 so as to provide to an amplifier 58 a frequency which is the difference between the frequency of the oscillators formed by the SAW devices 17, 46. Instead of using SAW resonators, the SAW devices 17, 46 may be SAW delay lines, connected in various configurations so as to provide the desired frequency effect. All of the foregoing is known in the art.

Referring again to FIGS. 1 and 2, in accordance with the invention, the SAW device 17 is isolated from a chamber 60 formed within the walls of a fully enclosed structure which may be made of elements of quartz 14, 62-64 bonded together with joints 65 of a suitable bonding agent. Within the chamber 60, a suitable damping fluid, such as silicone oil, is provided so as to damp the motion of the mass. In order to not mitigate or totally destroy the capability of an effective acoustic surface wave within the devices 17, 46, these devices are isolated from the chamber 60 by means of plates 66, 68 which are bonded to and separated from the beam 12 by annular seals 70, 72, which may comprise polyimid resin, sintered glass frit, or other suitable bonding agent. The quartz plate 66 may be as thin as is mechanically viable, such as on the order of 0.005". If the seals 70, 72 are of material which has an elastic modulus similar to quartz (stiff, brittle), such as glass frit or unfilled polymid, the plates 66, 68 must also be quartz and must have the same orientation as the quartz beam 12 so as to avoid any mechanical fault as a consequence of expansion and contraction due to temperature variations. Thus, the plates 66, 68 should by Y-cut with its X and Z axis aligned with those of the beam 12, in the example herein. On the other hand, if the seals 70, 72 are very soft, such as a heavily-filled polyimid, then the plates 66, 68 will be dimensionally independent of the beam, so far as thermal expansion is concerned, so a wide variety of materials can be used for the plates 66, 68. The seals may have a gross thickness on the order of 0.005" as well, the desire being to have the plate 66 disposed as close to the beam as possible without contacting the metallic elements of the SAW device 17. In the example herein, the quartz beam may have a thickness T of 0.04", a length L on the order of ½", and a width W on the order of ½". In other words, the entire device as looking down on it in FIG. 2, but including the full length of the beam and the mass 10, may be essentially square. Utilizing suitable metallization techniques, the SAW devices 17, 46 may be kept quite small, so that only a modest fraction of the beam becomes stiffened by the encapsulation (66, 70) of the present invention. For instance, the encapsulation may extend along approximately 20% of the cantilevered portion of the beam 12.

In accordance with the invention, it has been found that since the utilization of SAW devices of the type herein provide strain sensitivities which are about two orders of magnitude greater than those which can be provided by bonded resistive strain sensors, the reduction of strain as a function of acceleration in the beam 12 as a consequence of the encapsulation of the present invention is not prohibitive. For instance, if the sensitivity without the encapsulation of a cantilevered mass accelerometer employing a SAW device as described herein is on the order of one part in ten thousand without the encapsulation, it may drop to only two or three parts in ten thousand (in contrast with two or three parts per hundred for bonded resistive strain sensors), if a glass frit or other rigid seal is used with suitably oriented quartz plates. Therefore, the invention is in part predicated on the discovery that the surface wave effect can be isolated from a damping fluid without undue loss of desirable operating parameters. This is in part due to the fact that the encapsulation of the invention (66, 70) stiffens the beam 12 in the region of the SAW device, thereby increasing the mechanical resonant frequency of the beam so that additional mass can be utilized without lowering the resonant frequency below usefulness, so the strain per acceleration factor can be partially restored. On the other hand, if seals 70, 72 of very low modulus of elasticity are used, the stiffness of the plate will not affect the mechanical properties of the beam. Thus, contrary to a first glance notion that the encapsulation would degrade performance of a cantilevered mass accelerometer beyond usefulness, it in fact does not do so. Thus, the advantages of damping, a very high mechanical resonant frequency, and high sensitivity and attendant accuracy can all be achieved in accordance with the present invention.

Although described herein in an example which utilizes Y-cut quartz, the invention may be practiced in other configurations. For instance, improved temperature stability may be achieved utilizing 38° rotated Y-cut quartz. In such a case, however, the variation in acoustic propagation velocity as a function of strain will be sensed along the longitudinal axis (rather than transverse to it as in the example herein). Therefore, the elements of the SAW device would be mounted so that the velocity of the wave is along the longitudinal axis of the beam 12, rather than transverse to the longitudinal axis of the beam as in the Y-cut example given hereinbefore previously. In such case, seals 70, 72 which are very soft should be used to mitigate adverse effects on the beam.

Similarly, although the invention has been shown and described with respect to exemplary embodiments, it should be understood by those skilled in the art that the foregoing and various other changes, additions and omissions may be made therein and thereto without departing from the spirit and the scope of the invention.

We claim:

1. A damped, cantilevered mass accelerometer comprising:
   a beam comprised of piezoelectric material rigidly disposed at a proximal end so as to form a cantilever and having an inertial mass disposed at the distal end thereof, a surface acoustic wave device formed on a first surface of said beam near said distal end, and circuit means for providing a signal indication of the acoustic velocity of a surface wave in said surface acoustic wave device;
   characterized by
   said beam being disposed within an enclosed chamber including a damping fluid, said surface acoustic wave device being isolated from said damping fluid by a thin wall sealed to said beam so that said surface acoustic wave device is encapsulated between said beam and said wall.

2. A cantilevered mass accelerometer according to claim 1 further characterized by a second surface acoustic wave device disposed on a surface of said beam opposite to said first surface, said second acoustic wave device being fully encapsulated by a wall to said opposite surface to provide encapsulation of said second surface acoustic wave device the same as that of the surface acoustic wave device formed on said first surface.

3. A cantilevered mass accelerometer according to claim 1 further characterized by said plate being sealed to said beam by a sintered glass frit.

4. A cantilevered mass accelerometer according to claim 3 further characterized by said sintered glass frit having a dimension transverse to said surface which is just sufficient to mount said plate without contacting the elements of said SAW device.

5. A cantilevered mass accelerometer according to claim 1 further characterized by said plate being sealed to said beam by a soft polyimid.

* * * * *